(12) United States Patent
Nielsen et al.

(10) Patent No.: US 8,408,083 B2
(45) Date of Patent: Apr. 2, 2013

(54) LINEAR ACTUATOR

(75) Inventors: Jens J. Nielsen, Broager (DK); Norbert Klinke, Augustenborg (DK)

(73) Assignee: Linak A/S, Nordborg (DK)

( * ) Notice: Subject to any disclaimer, the term of this patent is extended or adjusted under 35 U.S.C. 154(b) by 0 days.

(21) Appl. No.: 13/067,457

(22) Filed: Jun. 2, 2011

(65) Prior Publication Data

US 2011/0296935 A1 Dec. 8, 2011

Related U.S. Application Data

(63) Continuation of application No. 11/667,493, filed as application No. PCT/DK2005/000728 on Nov. 16, 2005, now abandoned.

(30) Foreign Application Priority Data

Nov. 17, 2004 (DK) .................................. 2004 01787

(51) Int. Cl.
*F16H 27/02* (2006.01)
(52) U.S. Cl. ........................................ 74/89.23; 74/89.2
(58) Field of Classification Search ............. 74/89, 89.2, 74/89.21, 89.22, 89.28, 89.23, 89.32, 89.33, 74/89.35; 248/132, 161, 188.1, 188.2, 188.5, 248/405; 254/394, 395, 396, 397
See application file for complete search history.

(56) References Cited

U.S. PATENT DOCUMENTS

| 1,815,954 A | 7/1931 | Opie |
| 3,630,096 A | 12/1971 | Brewer |
| 3,932,956 A * | 1/1976 | Young ........................... 446/463 |
| 4,539,450 A | 9/1985 | Lorenz et al. |
| 4,568,808 A | 2/1986 | Thuries et al. |
| 4,647,014 A * | 3/1987 | Ekman ........................... 254/221 |
| 4,754,949 A | 7/1988 | Fukamachi |
| 4,892,011 A | 1/1990 | Nishida et al. |

(Continued)

FOREIGN PATENT DOCUMENTS

| EP | 0931479 | 7/1999 |
| EP | 0982018 | 3/2000 |

(Continued)

OTHER PUBLICATIONS

English Abstract of EP0982018.

(Continued)

*Primary Examiner* — Phillip A Johnson
(74) *Attorney, Agent, or Firm* — Dykema Gossett PLLC (57) ABSTRACT

A linear actuator, in particular telescopic legs for height-adjustable tables, and comprising an outer profile (18), a spindle (7) mounted at an upper end of the outer profile, a transmission (8) connecting the spindle (7) with a reversible electric motor, a spindle nut (11) secured against rotation on the spindle (7), an intermediate profile (10) mounted with its one end on the spindle nut (11), a guide at a lower end of the outer profile (18) for the intermediate profile (10), a cord element (12, 20; 26) secured at the lower end of the outer profile (18) and connected via a guide with an inner profile (14), such that this together with the intermediate profile (10) is telescopically pushed out of and into the outer profile (18) by the rotation of the spindle. When the inner profile (14) is secured against rotation on the intermediate profile (10), and the rotational securing of the spindle nut (11) is constituted by longitudinal guides in the outer profile (18), then an actuator is achieved which per se is secured against rotation, i.e., when applied in telescopic legs, there is no need to have a rotational protection via the leg. In general, the structure is slender and may thereby be used in thin telescopic table legs.

21 Claims, 7 Drawing Sheets

U.S. PATENT DOCUMENTS

| | | | | |
|---|---|---|---|---|
| 5,027,666 A | * | 7/1991 | Filicetti | 74/37 |
| 5,112,019 A | * | 5/1992 | Metzler et al. | 248/405 |
| 5,114,109 A | * | 5/1992 | Fitz et al. | 248/404 |
| 5,489,056 A | | 2/1996 | Staschewski | |
| 6,546,880 B2 | * | 4/2003 | Agee | 108/147 |
| D500,509 S | * | 1/2005 | Nielsen et al. | D15/148 |
| 7,168,665 B2 | * | 1/2007 | Hong et al. | 248/125.1 |
| 7,389,974 B2 | * | 6/2008 | Garrec | 254/394 |
| 2002/0043596 A1 | * | 4/2002 | Forsberg | 248/188.5 |
| 2003/0000322 A1 | | 1/2003 | Nagai et al. | |
| 2004/0075736 A1 | | 4/2004 | Yuasa et al. | |

FOREIGN PATENT DOCUMENTS

| | | |
|---|---|---|
| SE | 513249 | 8/2000 |
| WO | 9919247 | 4/1999 |
| WO | 0152700 | 7/2001 |
| WO | 0174198 | 10/2001 |
| WO | 03003876 | 1/2003 |

OTHER PUBLICATIONS

English Abstract of SE513249.

* cited by examiner

LINEAR ACTUATOR

CROSS-REFERENCE TO RELATED APPLICATION

This application is a continuation of application Ser. No. 11/667,493, filed May 10, 2007 (now abandoned), which was a national phase of PCT/DK2005/000728, filed 16 Nov. 2005. All priorities are requested.

BACKGROUND OF THE INVENTION

1. Field of the Invention
The present invention relates to a linear actuator.
2. The Prior Art
Initially, it is observed that a distinction is made between lifting columns for beds and lifting columns for height-adjustable tables. Lifting columns for beds are much more sturdy than lifting columns for tables, where the design of the latter is moreover an important parameter, because the lifting columns serve as table legs and thereby have a considerable influence on the appearance of the table. In order to be as free as possible in the design, drive units are desired which may be used in an arbitrary table leg directly or with just insignificant adaptations. This also means that the drive unit is slender and altogether takes up as little space as possible and may additionally be used for lifting columns with two extensible members The invention is directed to lifting columns for height-adjustable tables, for which a variety of linear actuators are now available. All of these are largely based on spindle technique, viz. a hollow spindle in cooperation with a solid spindle. An example of this may be found in e.g. WO 02/39848 to Linak A/S and WO 01/78556 to Okin Gesellschaft für Antriebstechnik GmbH & Co. KG. WO 03/003876 A1 discloses an individual example of a linear actuator based on a chain which is driven by an electric motor via a transmission. A rod is secured to each of the runs of the chain between two pairs of chain wheels, said rod being extended from its respective end of the actuator. Although the structure appears as an elongated rod, it is still rather bulky, all things considered.

The object of the invention is to provide a new structure of a linear actuator.

SUMMARY OF THE INVENTION

This new actuator according to the invention is constructed such that the synchronous telescopic movement of the intermediate pipe and the inner profile is caused by a spindle and a cord element, respectively. Cord element is here taken to mean a cord, a wire, a band, a tape, a chain and the like. The unit, per se, is secured against rotation in that the inner profile is secured against rotation on the intermediate pipe and the spindle nut via the outer pipe. With, e.g., table legs of circular cross-section for height-adjustable tables, a quite considerable simplification is achieved, as it is not necessary also to take it into consideration that the table leg is also to serve as a rotational protection for the actuator. Thus, a clear separation between table legs and actuator is achieved.

Cord element is here taken to mean a cord, a wire, a band, a chain and the like or combinations thereof. To extend the inner profile, a guided chain length may be used, taking advantage of its rigidity, and ensuring a constant pull in the chain length by a wire when the inner profile is run in.

To achieve torsional stability in the actuator, the inner profile and the intermediate pipe are configured with mutual means for guiding the inner profile on the pipe. Thus, the inner profile is guided on the intermediate pipe and is thereby torsionally stable. Quite simply, the guide may consist in the inner profile having a U-shaped cross-section, where the sides grip the intermediate pipe. Alternatively, guide fins and grooves, e.g. T-shaped guide fins, may be provided.

With a desired slender cross-section, this per se puts a limit on the torsional stability. When e.g. a table is moved and a foot beam hits a door frame or another fixed object, the leg is subjected to a considerable torque. To prevent this from propagating to the actuator, the actuator is secured to the leg via a skid coupling such that the foot can turn. The skid coupling is adapted such that no greater movement than the permissible one is transferred to the actuator, but also such that the foot may manually be turned back. It may be an ordinary skid coupling based on frictional discs, spring-loaded balls, knurled pattern or the like.

A linear actuator according to the invention will be described more fully below with reference to the accompanying drawings.

DETAILED DESCRIPTION OF THE PREFERRED EMBODIMENTS

Figure 1:
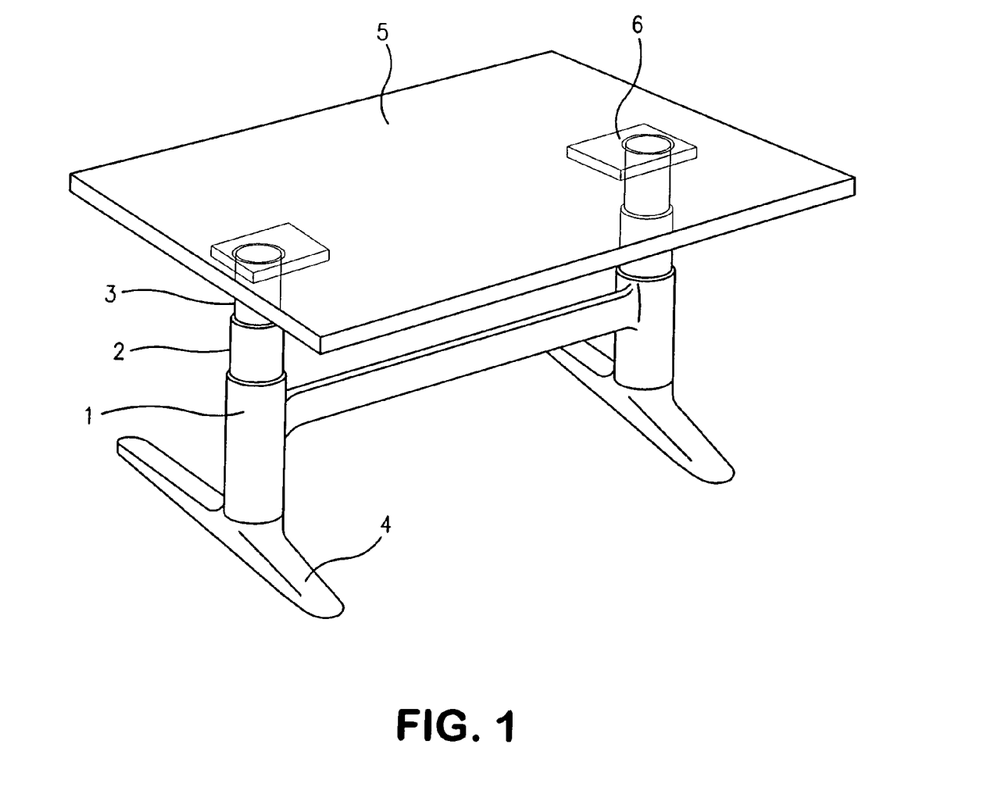
FIG. 1 shows a sitting/standing table shown with a transparent tabletop.

FIG. 1 of the drawing shows a sitting/standing table with a telescopic leg or lifting column at each side. It is observed that the tabletop is shown transparent. The lifting column consists of a guide having three members, viz. an outermost section 1, an intermediate section 2 and an innermost section 3 arranged telescopically inside each other, with slides arranged in the gaps between the individual sections. The lower end of the outermost section 1 is secured in a foot 4, while the upper end of the innermost section 3 is secured to the lower side of the tabletop 5. A drive device according to the invention is provided inside the lifting columns for causing the telescopic movement.

Figure 2:
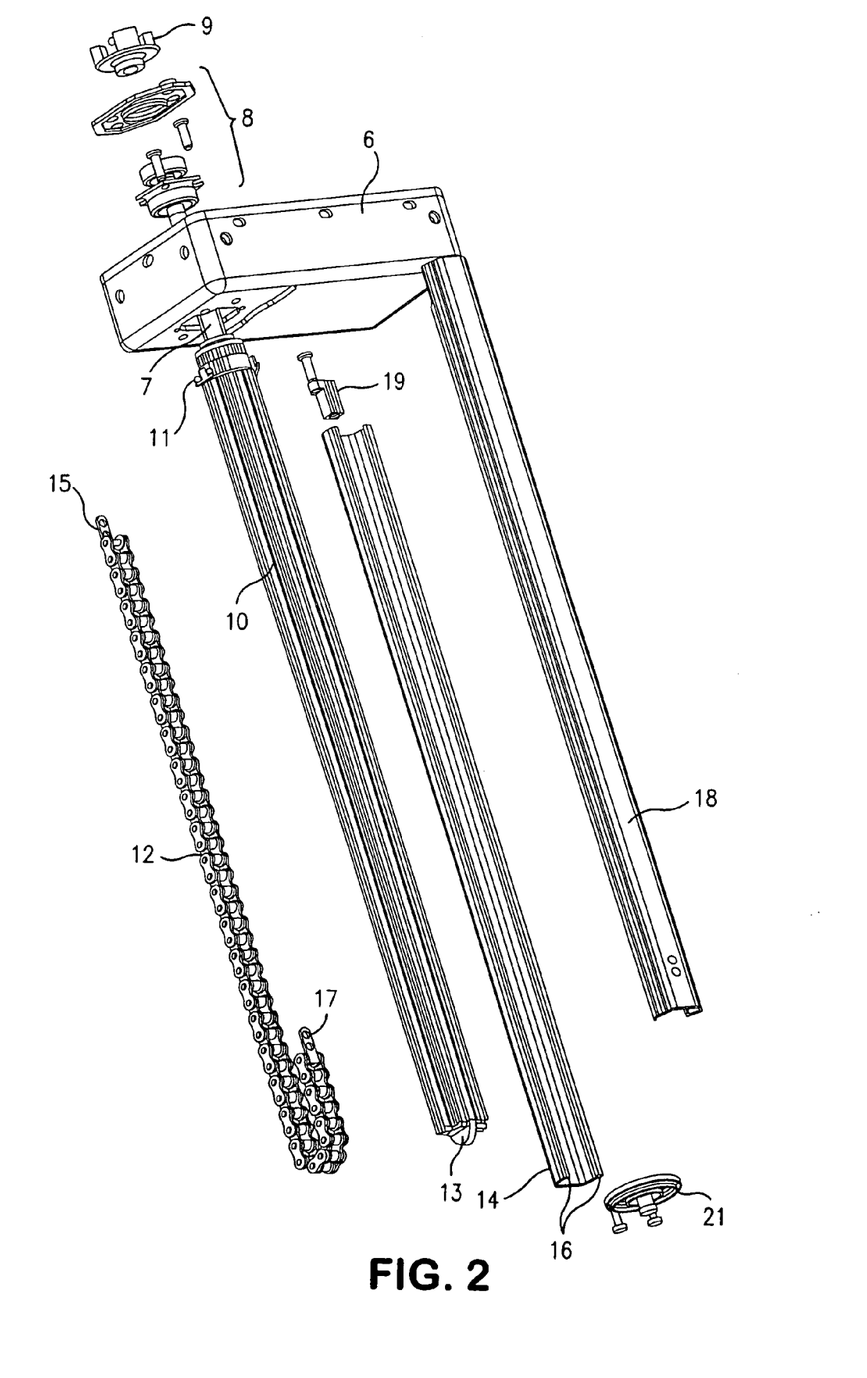
FIG. 2 shows an exploded view of an embodiment of the actuator according to the invention.

As will appear from FIG. 2, the drive device is formed by a linear actuator comprising a motor housing 6 containing a reversible electric motor and a transmission. A spindle 7 is secured by a bracket 8 in a recess in the lower side of the motor housing. For coupling to the transmission, the end of the spindle is provided with one half of a claw coupling 9. A spindle nut 11 for the spindle is secured at the top of the intermediate profile, which is an extruded aluminium pipe 10 here. When the spindle is caused to rotate by the motor, the intermediate profile 10 will be moved out or in on the spindle depending on the direction of rotation of the motor, the intermediate profile being secured against rotation.

A chain 12 extends along the one side of the intermediate profile 10 and around the end of the profile and up along the other side of it. A bracket with a semicircular guide piece 13 is secured to the intermediate profile in order to guide the chain. An inner profile 14 in the form of a rail is secured to the other end of the chain. For this purpose, the chain is provided with a bracket 15 to which the inner profile is secured by screwing. The inner profile is guided with side edges 16 in matching grooves on the intermediate profile 10. An outer profile 18 is secured by a bracket 17 to the other end of the chain, the outer profile being secured with its upper end to the motor housing 6.

When the motor housing 6 is lifted as a consequence of the spindle running out of the intermediate profile, the outer profile 18 will bring the chain along, whereby the inner profile 14 on the opposite side of the intermediate profile 10 will be extended from the end of the intermediate profile. This results in a stroke length at each end of the actuator, i.e. in total a double stroke length.

To keep the chain taut in an inward direction, a wire (not shown in the drawing) is secured to the upper end of the inner profile 14 via a bracket 19, the wire extending in a groove in the spindle nut 11 at the side of the spindle and being secured to the end of the chain by the bracket 17. In an inward direction, the outer profile 18 will apply a pull to the wire via the firm connection with the spindle 17 over the housing 6 and thereby pull the end 15 of the chain.

Figure 3:
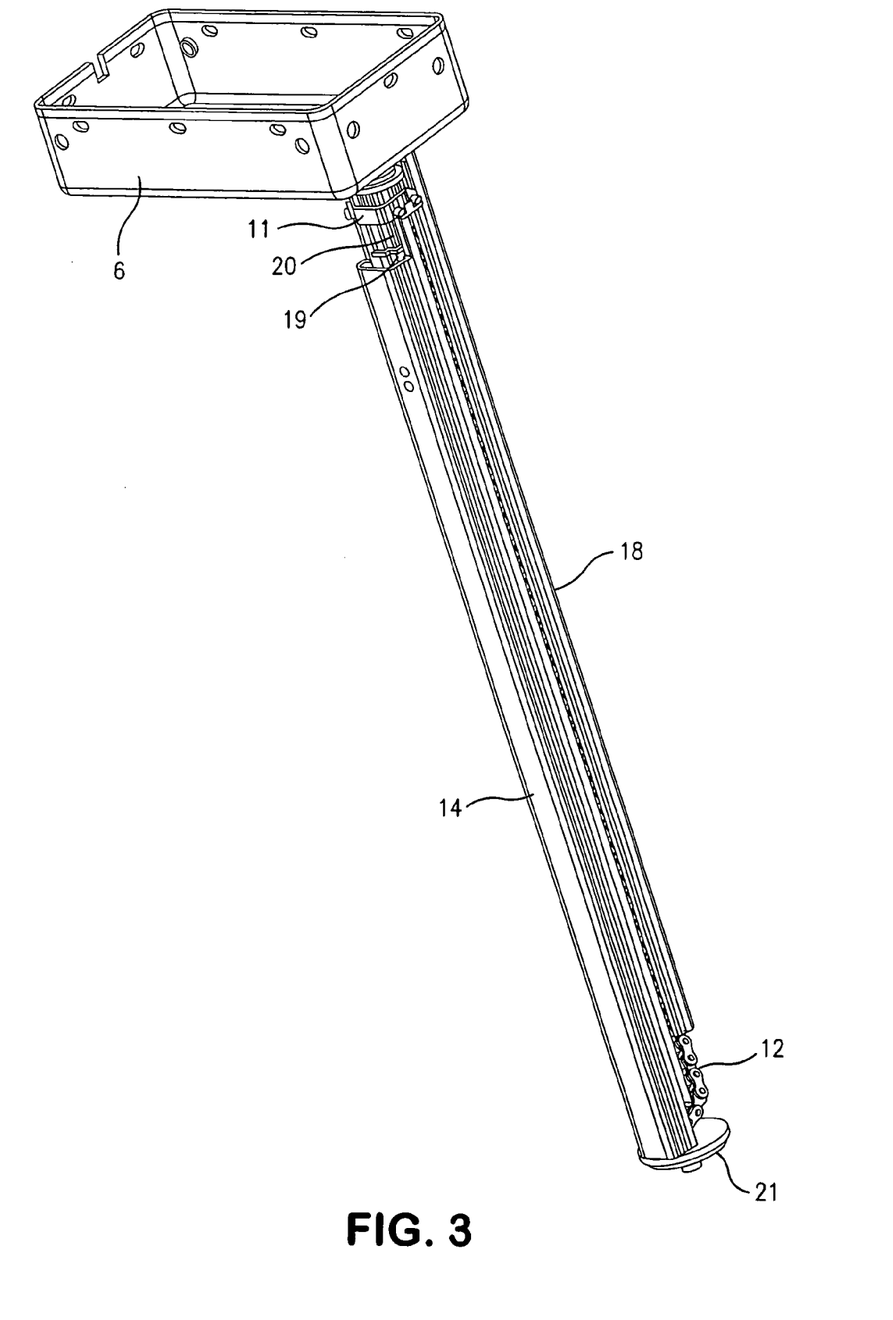
FIG. 3 shows a perspective view of the actuator of FIG. 2 in an assembled state.

FIG. 3 of the drawing shows a view of the actuator in an assembled state, but without transmission and motor. The wire 20 and the bracket 19 can be seen faintly in the drawing.

A mounting bracket 21 is secured by two screws to the lower end of the inner profile 14, the mounting bracket being unique in that it contains a skid coupling disposed between the part which is to be secured to the inner profile and the part which is intended to be secured to the lifting column. In the present case, the skid coupling is configured with a knurled pattern in two mutually facing faces of the bracket.

Figure 4:
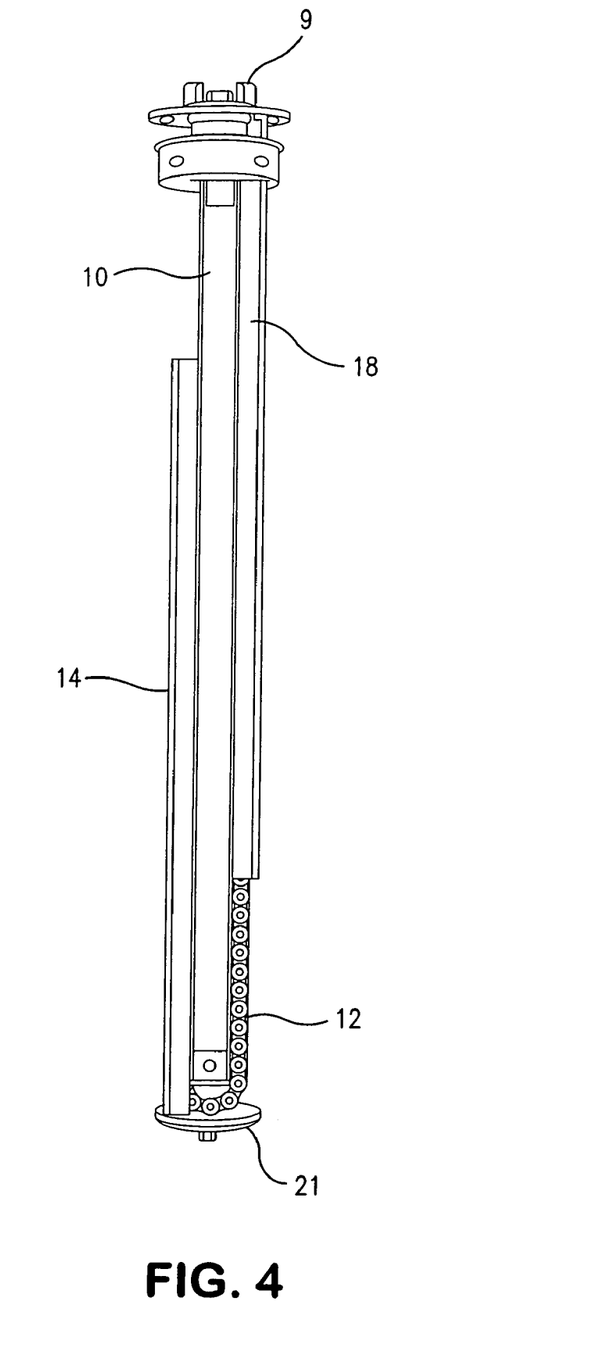
FIG. 4 shows a perspective view of a slightly modified configuration of the actuator of FIGS. 2 and 3, but shown without a motor housing.
Figure 5:
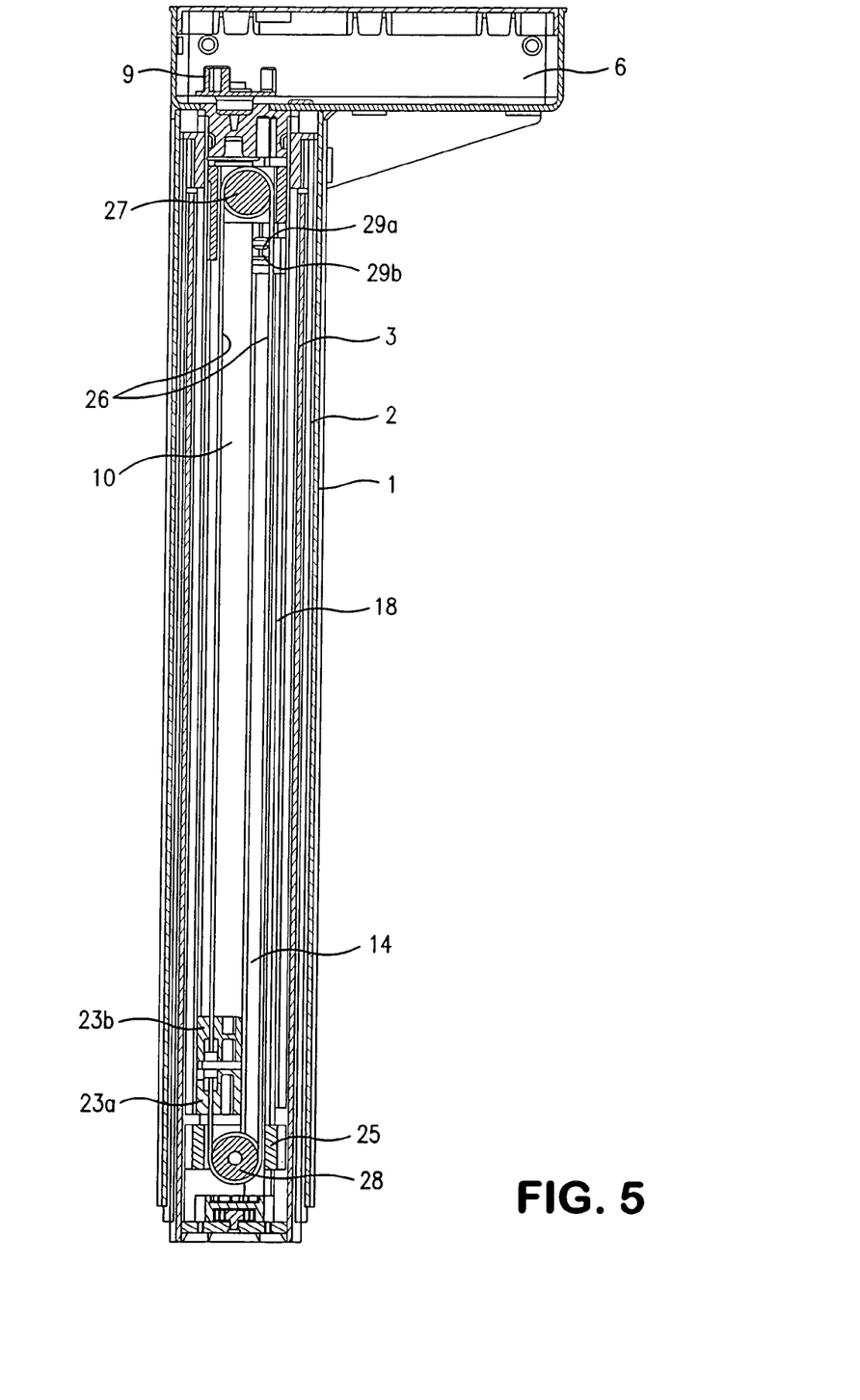
FIG. 5 shows a longitudinal section through a telescopic leg for a table and provided with a second embodiment of the actuator according to the invention.
Figure 6:
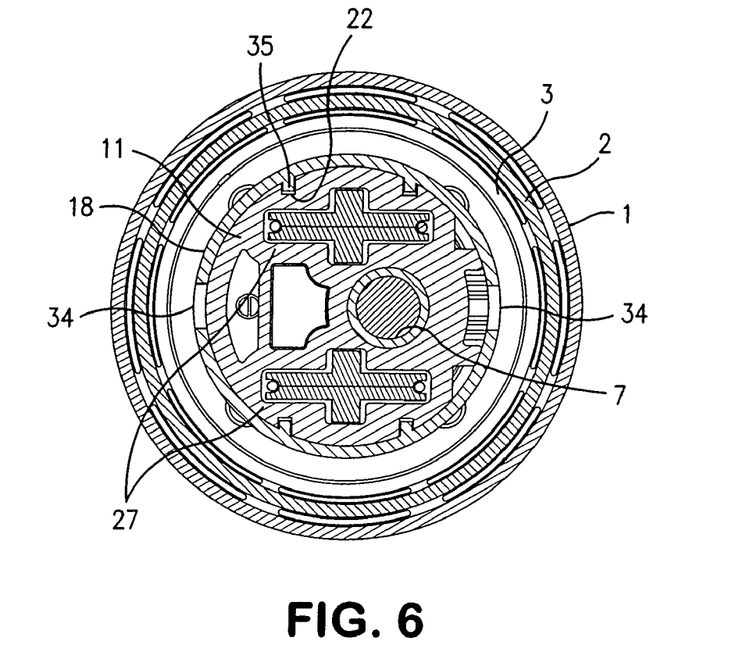
FIG. 6 shows a cross-section of the telescopic leg.
Figure 7:
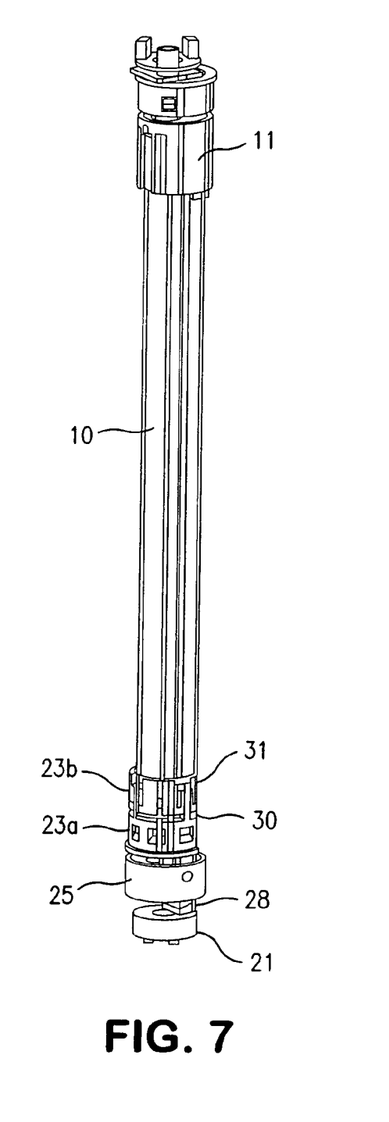
FIG. 7 shows the actuator of FIG. 5 shown without an outer profile and a motor housing.
Figure 8:
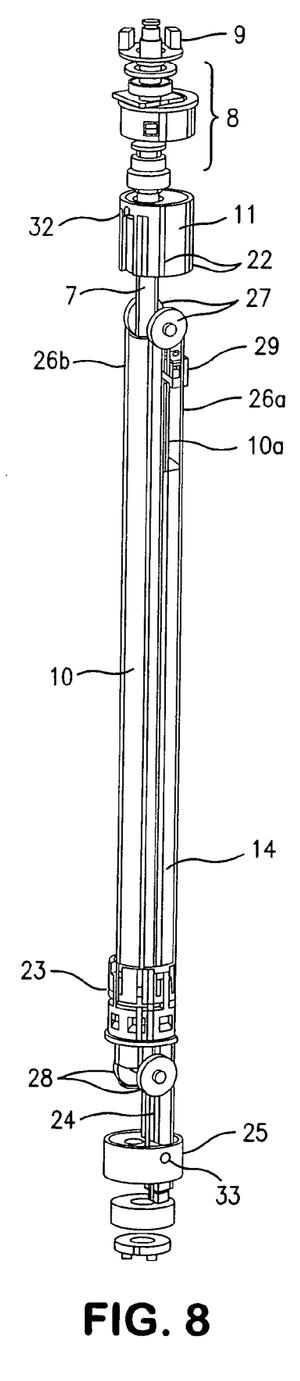
FIG. 8 shows the actuator of FIG. 7 shown partly as an exploded view.

A simpler configuration of the actuator is shown in FIG. 4 of the drawing, where the intermediate profile 10 is just a four-sided steel pipe, and the inner profile 14 and the outer profile 18 are U-shaped rails which are guided with the sides toward the pipe. The actuator is shown here without the mofor housing.

FIGS. 5-9 of the drawing show a second embodiment of the actuator according to the invention, in which the same reference numerals are used for the same parts as are used in the foregoing. The intermediate profile 10 and the outer profile 18 are here pipes of circular cross-section, with longitudinal ribs 35 arranged internally in the outer profile 18, the ribs 35 being fitted in grooves 22 in the spindle nut 11 for securing the spindle nut against rotation. At the lower end of the outer profile 18 there is an end plug 23 with a through and guide hole for the intermediate profile 10, and also a through opening for the inner profile 14 is provided. The inner profile 14 is guided on the side of the intermediate profile 10 with a longitudinal T-shaped guide fin 10a thereon, and which is received in a corresponding groove 24 in the inner profile 14, and which simultaneously secures it against rotation. The lower end of the intermediate pipe 10 has secured thereon a cylindrical plug 25 with a through and guide hole for the inner profile 14 which has a substantially quadrangular cross-section.

In contrast to the foregoing, the inner profile 14 is moved by a wire having two runs 26a, 26b extending opposite each other on the intermediate profile 10. At the top the wires runs over a pair of deflection wheels 27 mounted in the spindle nut 11, and at the bottom the wire runs about another pair of deflection wheels 28 mounted in the plug 25 on the end of the inner profile 14. The wire additionally runs around upper and lower guide faces 29a, 29b in an end plug 29 secured at the upper end of the inner profile 14. The ends of the wire are secured in the end plug 23 on the outer profile, which is configured here as a wire tensioner. The end plug consists of two parts 23a, 23b, one part 23a of which is provided with legs 30 configured with barbs, and the other part 23b of which is provided with slots 31 to receive the legs of the first part 23a. The side walls of the slots are likewise provided with barbs for cooperation with the barbs on the legs. In addition, the side walls of the slots 31 are configured to protrude freely upwards and resiliently toward each other to firmly engage the legs on the part 23a. Pushing the part 23a with the legs up toward the part 23b results in tensioning of the wire. It is observed that only one wire is provided, and it is passed around the various deflection wheels and guide faces in a loop.

Rotation of the spindle 7 causes the intermediate profile 10 to be extended, and since the wire runs around the deflection wheels 28 at the outer end of the intermediate profile and up around the upper end 29 of the inner profile 14, this is extended synchronously. In the return movement, the intermediate profile 10 is pushed up, and the second wire run around the upper end 29 of the inner profile 14 and up around the uppermost deflection wheels 27 pulls the inner profile 14 along in the upward movement.

The three sections of the lifting column are secured to the actuator as follows. The outermost section 1 is secured to the motor housing, while the intermediate section 2 is secured to the spindle nut 11 by two screws through diametrically disposed longitudinal slots 34 in the outer profile 18 of the actuator, and the screws are received in screw holes 32. The innermost section 3 is secured to the plug 25 at the end of the intermediate profile 10, which takes place by screws into screw holes 33.

Figure 9:
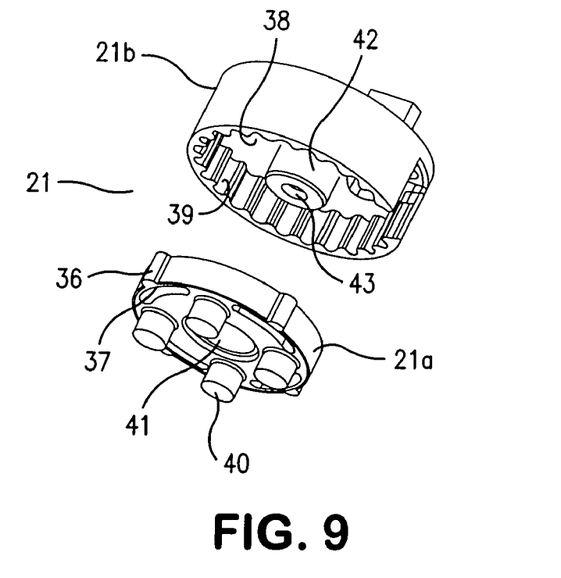
FIG. 9 shows an exploded view of mounting brackets with a skid coupling at the lower end of the actuator.

As mentioned, the foot of the table is mounted on the inner profile 14 via the mounting bracket 21 configured as a skid coupling. The mounting bracket comprises a first part 21a in the form of a circular disc, where the side wall is configured with four bosses 36 on a portion of the side wall, a recess 37 being provided rearwardly so that the portions with bosses may yield resiliently. This portion 21a is received in a circular well 38 at the end of the second part 21b of the mounting bracket. The side wall of the well 38 has a wave shape 39 which fits the bosses 36 on the first part 21a of the bracket. Four towers 40 are provided on the lower side of the first part 21a for reception in holes in the foot. The first part 21a is centered in the second part with a hole 41 around a hub 42 in the second part 21 and is retained by a screw in the hub, which has a screw hole 43 intended for the purpose. If the foot of the table encounters an obstacle, the skid coupling starts clicking so that the torque is not transferred further up to the vital parts of the actuator. Subsequently, the foot may be turned into position again. Of course, this may also be utilized for adjusting the foot, if it is desired to give it another position than precisely perpendicular to the longitudinal axis of the table.

The invention thus provides a particularly simple and slender structure of an actuator with a double stroke length. The structure may be used directly, or with just simple adapters at the top of the leg immediately below the motor housing, in telescopic legs of any cross-section, including a circular cross-section, as the actuator per se is torsionally stable.

The invention claimed is:

1. A lifting column which comprises:
   a first section,
   a second section,
   an intermediate section located between said first section and said second section, and
   a linear actuator, said linear actuator comprising an outer profile, a spindle mounted at an upper end of the outer profile, a transmission connecting the spindle with a reversible electric motor, a spindle nut secured against rotation on the spindle, an intermediate profile mounted with one end thereof on the spindle nut, a first guide at a lower end of the outer profile for the intermediate profile, a cord element secured at the lower end of the outer profile and connected via a guide with an inner profile so that the inner profile together with the intermediate profile is telescopically pushed out of and into the outer profile by the rotation of the spindle, wherein the inner profile is secured against rotation on the intermediate profile, and the rotational securing of the spindle nut is constituted by longitudinal guides in the outer profile, so that the spindle nut with the intermediate profile moves on the spindle by the rotation thereof, said outer profile of said linear actuator being attached to said first section of said lifting column, said inner profile of the linear actuator being attached to the second section of said lifting column, and said intermediate profile of said linear actuator being attached to said intermediate section of said lifting column.

2. The lifting column according to claim 1, wherein said cord element consists of a chain.

3. The lifting column according to claim 2, wherein said guide comprises a curve-shaped piece secured to the lower end of the intermediate profile over which said chain moves.

4. The lifting column according to claim 1, wherein the inner profile and the intermediate profile are configured with mutual means for guiding the inner profile on the intermediate profile.

5. The lifting column according to claim 1, wherein the intermediate profile and the outer profile consist of pipes having circular cross-sections.

6. The lifting column according to claim 5, wherein a cylindrical plug is secured on the lower end of the intermediate pipe, wherein the inner profile has a substantially quadrangular cross-section, and wherein said cylindrical plug has a through and guide hole for the inner profile.

7. The lifting column according to claim 1, wherein the outer profile includes internal longitudinal ribs fitted in grooves in the spindle nut for securing the spindle nut against rotation.

8. The lifting column according to claim 1, wherein at the lower end of the outer profile there is an end plug having a through and guide hole for the intermediate profile, and a through opening for the inner profile.

9. The lifting column according to claim 1, wherein the inner profile is guided on a side of the intermediate profile with a longitudinal T-shaped guide fin thereon, and which is received in a corresponding groove in the inner profile, and which simultaneously secures the inner profile against rotation.

10. The lifting column according to claim 1, wherein the inner profile is moved by a wire having two runs extending opposite each other on the intermediate profile.

11. The lifting column according to claim 10, wherein at a top, the wire runs around a pair of deflection wheels mounted in the spindle nut, and at a bottom the wire runs around another pair of deflection wheels mounted in a plug on the end of the inner profile.

12. The lifting column according to claim 10, wherein the wire is additionally moved around upper and lower guide faces in an end plug secured at the upper end of the inner profile.

13. The lifting column according to claim 12, wherein the end plug on the outer profile is configured as a wire tensioner.

14. The lifting column according to claim 13, wherein the end plug consists of two parts, a first part which is provided with legs provided with barbs, and a second part which is provided with slots for receiving the legs of the first part, and side walls of the slots are likewise provided with barbs for cooperation with the barbs of the legs.

15. The lifting column according to claim 14, wherein the side walls of the slots are configured to protrude freely upwards and resiliently toward each other for engagement with the legs of the first part.

16. The lifting column according to claim 1, wherein an outermost section in a telescopic leg is secured to a motor housing, while said intermediate section is secured to the spindle nut by screws through diametrically disposed longitudinal slots in the outer profile, while an innermost section is secured to a plug at the end of the intermediate profile.

17. The lifting column according to claim 1, wherein a bracket for securing a telescopic leg is secured to a free end of the inner profile, and a skid coupling is integrated in the bracket between a first part which is to be secured to the inner profile and a second part which is to be secured to the telescopic leg.

18. The lifting column according to claim 17, wherein the skid coupling comprises a first part and a second part configured with bosses and a wave-shaped wall, respectively, said bosses engaging and being capable of yielding resiliently to each other.

19. The lifting column according to claim 18, wherein the first part of the skid coupling comprises a circular disc, where the bosses are on an outer side of the circular disc, and the first part of the skid coupling is received in a circular well at an end of an second part of the skid coupling, a side of said circular well defining said wave-shaped wall.

20. The lifting column according to claim 19, wherein the bosses are provided on a resilient portion of the circular disc.

21. The lifting column according to claim 20, wherein the first part is centered in the second part with a hole around a hub in the second part.

* * * * *